(12) United States Patent
Mangin et al.

(10) Patent No.: US 6,222,825 B1
(45) Date of Patent: Apr. 24, 2001

(54) ARRANGEMENT FOR DETERMINING LINK LATENCY FOR MAINTAINING FLOW CONTROL IN FULL-DUPLEX NETWORKS

(75) Inventors: James Mangin, San Ramon; Jayant Kadambi, Milpitas; Mohan Kalkunte; Shashank C. Merchant, both of Sunnyvale, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/788,821

(22) Filed: Jan. 23, 1997

(51) Int. Cl.[7] .................................................. G01R 31/08
(52) U.S. Cl. ........................................... 370/235; 370/229
(58) Field of Search ....................................... 370/229, 230, 370/231, 232, 235, 236, 237, 252, 254, 445, 410, 400; 709/234

(56) References Cited

U.S. PATENT DOCUMENTS

| | | | |
|---|---|---|---|
| 4,247,934 | * 1/1981 | Parras | 370/249 |
| 4,764,980 | * 8/1988 | Sakaguchi | 370/249 |
| 5,121,382 | * 6/1992 | Yang | 370/250 |
| 5,550,802 | * 8/1996 | Worsley | 370/410 |
| 5,610,903 | * 3/1997 | Crayford | 370/248 |
| 5,673,254 | * 9/1997 | Crayford | 370/231 |
| 5,726,976 | * 3/1998 | Thompson | 370/229 |
| 5,784,559 | * 7/1998 | Frazier | 370/229 |
| 5,805,597 | * 9/1998 | Edem | 370/445 |
| 5,825,755 | * 10/1998 | Thompson | 370/445 |
| 5,905,870 | * 5/1999 | Mangin | 709/234 |
| 5,995,488 | * 11/1999 | Kalkunte | 370/232 |

OTHER PUBLICATIONS

"Am79C971 PCnet–FAST Single–Chip Full–Duplex Ethernet Controller for PCI Local Bus", Preliminary Data Sheet Publication #20550, Rev. B, Issued May 1996 by Advanced Micro Devices, Inc.

Breyer et al., "Switched and Fast Ethernet: How It Works and How to Use It", Ziff–Davis Press, Emeryville, CA (1995), pp. 60–70.

Johnson, "Fast Ethernet: Dawn of a New Network", Prentice–Hall, Inc. (1996), pop. 158–175.

Chiang, "A Look at 100BASE–T", Communications Systems Design (Aug. 1995), pp. 43–51.

\* cited by examiner

*Primary Examiner*—Douglas Olms
*Assistant Examiner*—Ricardo M. Pizzaro

(57) ABSTRACT

Apparatus and method for more precise controlling of congestion on a network, provides for remote controlling of a remote station on the network by a local station to configure the remote station into a remote loopback configuration. With the remote station thus configured, the local station is then able to determine the link latency of the link, during auto-negotiation, for example. Provided with the link latency, a congestion control algorithm in the local station may be adjusted to account for the link latency to better control the input data streams by controlling when the congestion relieving control signal, such as a PAUSE frame, is transmitted to the remote station to inhibit transmission and relieve congestion.

17 Claims, 12 Drawing Sheets

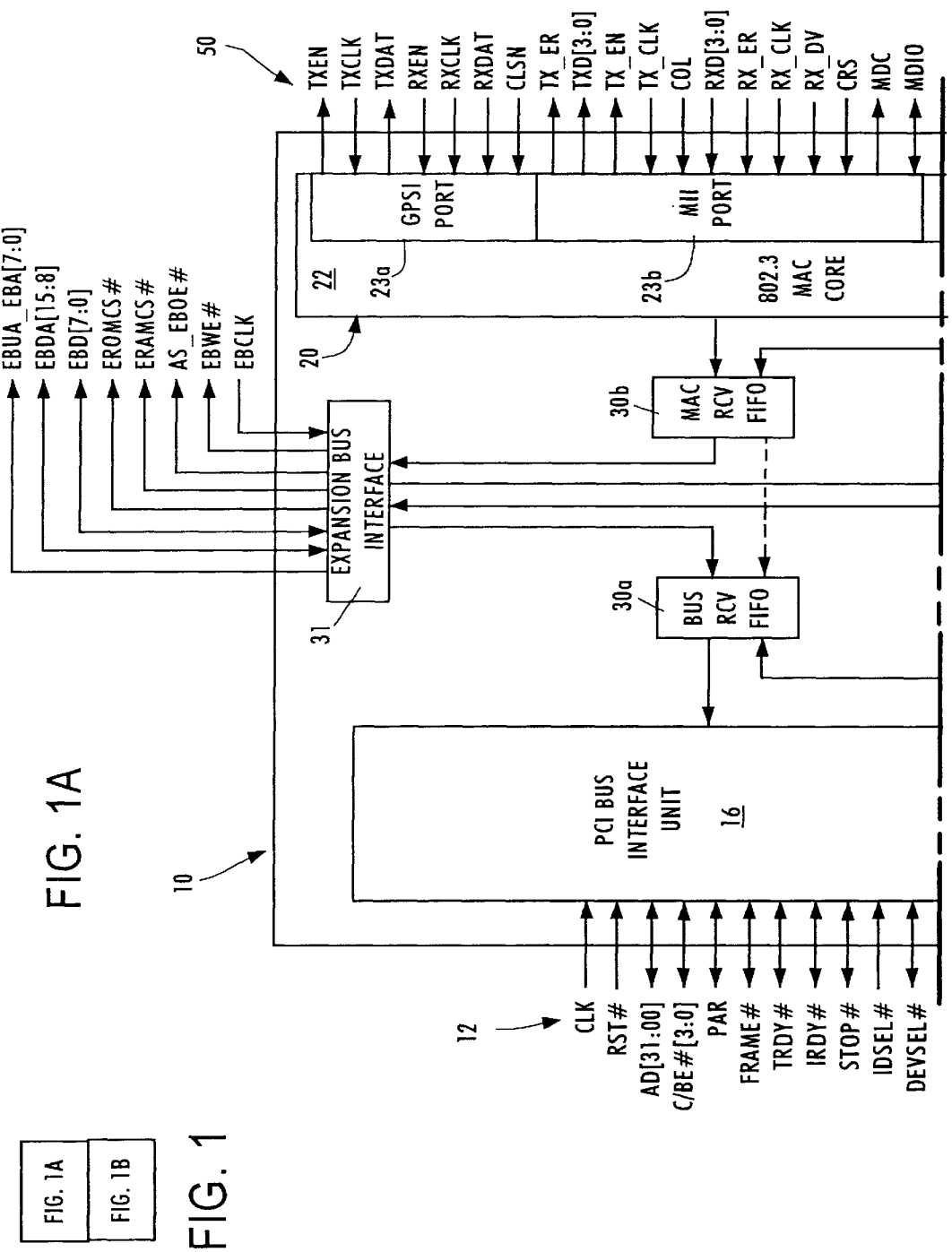

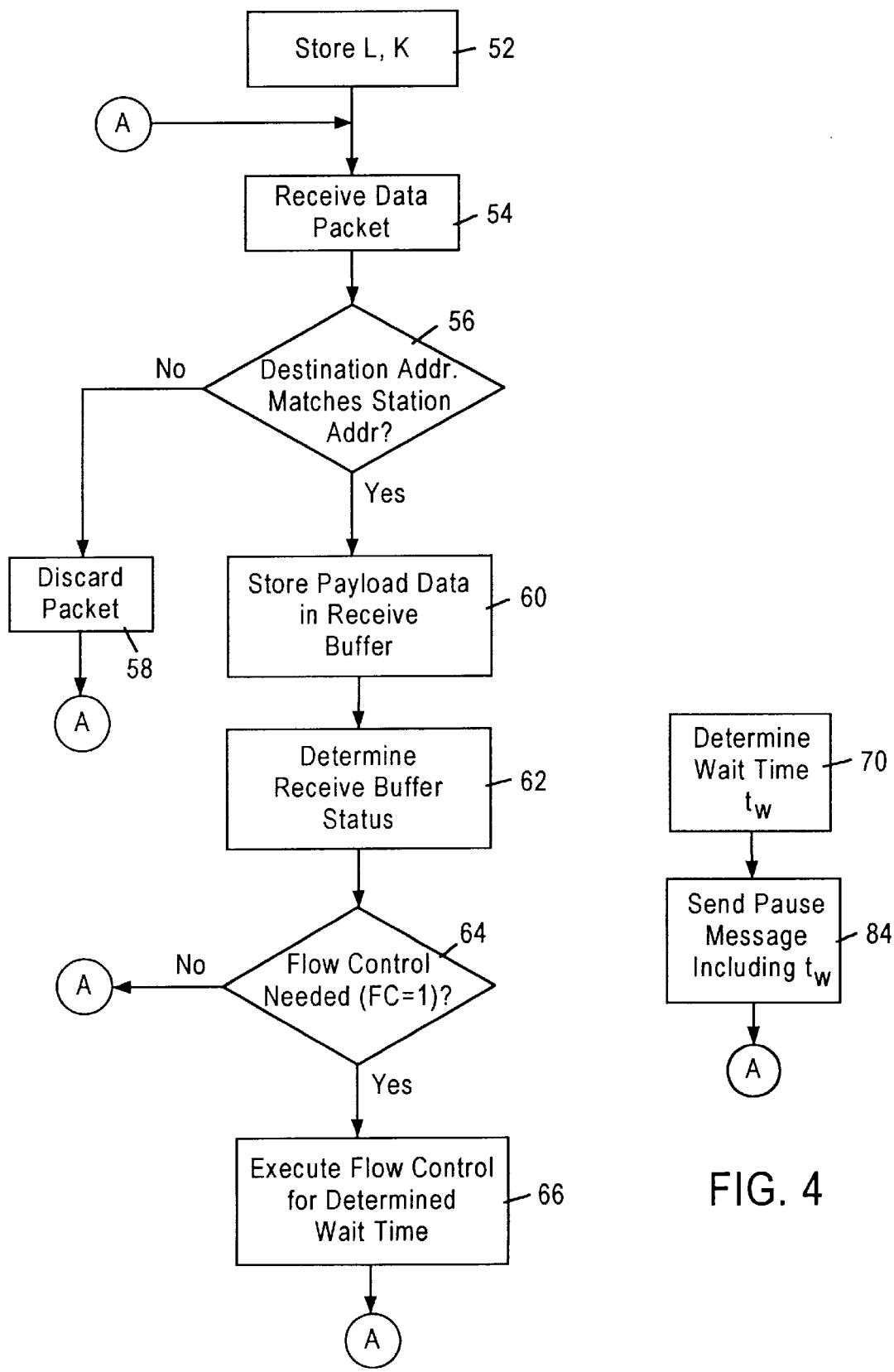

ARRANGEMENT FOR DETERMINING LINK LATENCY FOR MAINTAINING FLOW CONTROL IN FULL-DUPLEX NETWORKS

TECHNICAL FIELD OF THE INVENTION

The present invention relates to network interfacing and more particularly, to methods and systems controlling network data traffic on media of full-duplex networks.

BACKGROUND ART

Local area networks use a network cable or other media to link stations on the network. Each local area network architecture uses media access control (MAC) enabling network interface cards at each station to share access to the media.

A full duplex environment has been proposed for Ethernet networks, referred to as IEEE 802.3x, Full Duplex with Flow Control-Working Draft (0.3). The full duplex environment provides a two-way, point-to-point communication link between two network elements, for example a network station and a switched hub. Hence, two or more stations can simultaneously transmit and receive Ethernet data packets between each other via a switched hub without collisions.

Full-duplex operation does not require that transmitters defer, nor that they monitor or react to receive activity, as there is no contention for a shared medium in this mode. Full-duplex operation can be used when the physical medium is capable of supporting simultaneous reception and transmission (fibre or copper), there are exactly two stations on the link and both stations have been configured to use full duplex links. The most common configuration envisioned for full-duplex operation consists of a multiport bridge (a switch) with dedicated point-to-point connections to several end-stations.

Network congestion occurs if a receiving network element is unable to receive data at a rate greater than or equal to the transmission rate of the transmitting element. For example, traffic in a client-server environment is dominated by client requests followed by a burst of frames from the server to the requesting client. Although the full duplex environment enables the server to transmit packets while receiving requests from other clients, only a limited number of client requests can be output to the server from the switched hub at the assigned switching port. If the number of client requests exceeds the capacity of the server's port, some of the data packets will be lost. Alternatively, a client having limited buffer space may be unable to keep up with the transmission rate of the server, resulting in lost packets.

Flow control has been proposed to reduce network congestion, where a sending station temporarily suspends transmission of data packets. A proposed flow control arrangement for a full duplex environment, referred to as IEEE 802.3x[2], specifies generation of a flow control message, for example a PAUSE frame. A transmitting station that receives the PAUSE frame enters a pause state in which no frames are sent on the network for a time interval specified in the PAUSE frame. The PAUSE frame relieves congestion at the receiver. For example, in a switch with several 10 Mbps or 100 Mbps full-duplex ports, it is possible for the traffic from all the ports to overload the switch. In these periods, the switch will transmit PAUSE frames to those 10 Mbps or 100 Mbps ports that the switch believes are the source of the congestion. These stations will stop transmitting frames for the period specified by the PAUSE frame, thus relieving congestion at the switch.

The round-trip link delay between the switch and the end station has importance in times of congestion. If the link delay between the switch and the end station is long, and the bandwidth of the link is high, the transmission of a PAUSE frame after congestion is detected will not have effect until at least one round-trip link delay's worth of data has entered the switch. Similarly, when congestion is relieved and the switch transmits a PAUSE frame with value 0 (allowing station transmission), it will be at least one round-trip delay before data flows into the switch again.

SUMMARY OF THE INVENTION

There is a need for an arrangement that determines when to initiate flow control by a network element, taking into account the latency of a link, i.e., the round-trip delay of a point-to-point full-duplex connection.

These and other needs are met by the present invention which provides a method of determining a link latency between stations on a network, in which a physical layer of a remote station is placed into a remote loopback configuration so that all data received from the network is transmitted back onto the network. A specified data pattern is transmitted from a local station to the remote station. At the local station the specified data pattern that has been transmitted back onto the network by the remote station is detected. The link latency between the local station and the remote station is then determined as a function of the time elapsed between the transmitting of the specified data pattern from the local station and the detecting of the specified data pattern at the local station.

The earlier stated needs are also met by another embodiment of the present invention which provides a method of controlling a remote station on a network, in which a remote loopback control signal is transmitted from a local station to a remote station. At the remote station, the reception of the remote loopback control signal is detected. The remote station is configured in response to the reception of the remote loopback control signal such that all data received from the network is transmitted back onto the network.

The earlier stated needs are also met by a still further embodiment of the present invention which provides a method of controlling congestion at a local station in a network, comprising the steps of placing a physical layer of a remote station into a remote loopback configuration such that all data received from the network is transmitted back onto the network. A specified data pattern is transmitted from a local station to the remote station. The specified data pattern that has been transmitted back onto the network by the remote stations detected at the local station. The link latency between the local station and the remote station is then determined as a function of the time elapsed between the transmitting of the specified data pattern from the local station and the detecting of the specified data pattern at the local station. A congestion relieving signal is then transmitted from the local station to the remote station as a function of the determined link latency.

The earlier stated needs are also met by another embodiment of the present invention which provides a physical layer device connecting a station to a network, comprising a transmit side which transmits data from the station onto the network, a receive side which receives data from the network and provides the data to the station, and a configurable internal routing arrangement remotely controllable in response to a remote loopback configuration signal received from the network to couple the receive side to the transmit side such that all data received from the network is transmitted directly back onto the network.

The foregoing and other features, aspects and advantages of the present invention will become more apparent from the

BRIEF DESCRIPTION OF THE DRAWINGS

FIG. 3 is a flow diagram illustrating a method of controlling transmission of data packet according to an embodiment of the present invention.

FIG. 4 is a flow diagram illustrating flow control in a full duplex network.

DETAILED DESCRIPTION OF ILLUSTRATIVE EMBODIMENTS

The following description provides an exemplary embodiment of a network arrangement that makes use of the determination of the latency of a network link according to embodiments of the present invention. This network arrangement and the described use of the determined link latency are exemplary only, however, as other examples of network arrangements and uses of the determined link latency are contemplated without departing from the spirit and scope of the present invention.

Figure 1B:
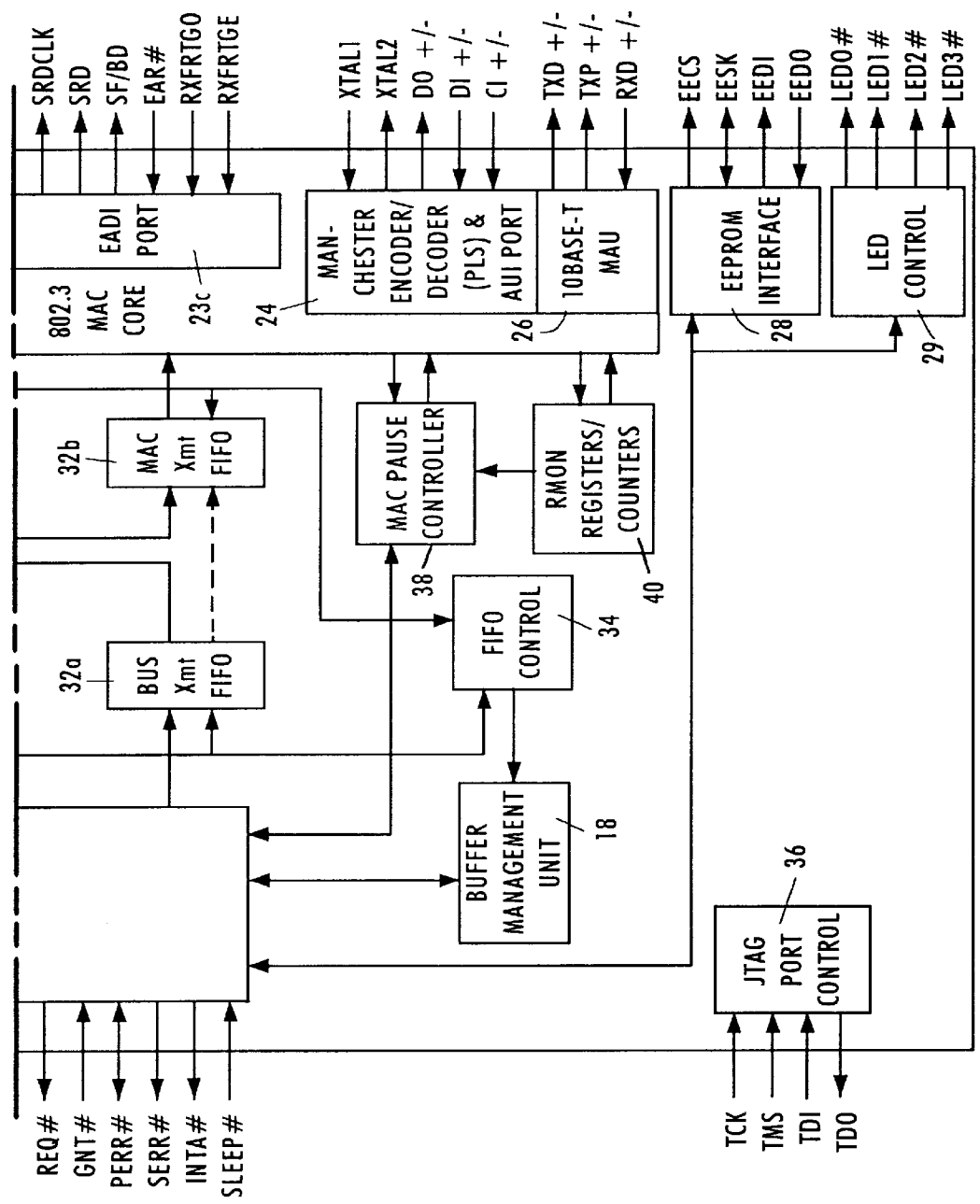
FIG. 1 is a block diagram of a network interface according to an embodiment of the present invention.

FIG. 1 is a block diagram of an exemplary network interface 10 of a network station that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the Am79C971 PCnet-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif., the disclosure of which is incorporated in its entirety by reference.

The interface 10 includes a PCI bus interface unit 16, a direct memory access (DMA) buffer management unit 18, and a network interface portion 20. The network interface portion 20 selectively operates in either half-duplex mode or full-duplex mode according to IEEE 802.3x[2]. The network interface portion 20 includes a media access control (MAC) core 22, a General Purpose Serial Interface (GPSI) 23a, a Media Independent Interface (MII) 23b for connecting external 10 MBit/s or 100 MBit/s transceivers, an External Address Detection Interface (EADI) 23c, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes an EEPROM interface 28, an LED control 29, and an expansion bus interface 31 for boot RAM (e.g., EPROM or Flash memory) during startup, and an IEEE 1149.1-compliant JTAG Boundary Scan test access port interface 36. Full-duplex operation can be performed by any of the AUI, GPSI, 10BASE-T and MII interfaces. Additional details of these interfaces are disclosed in the above-referenced Am79C971 Preliminary Data Sheet.

The network interface 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34. As shown in FIG. 1, the MAC receive FIFO buffer 30b effectively passes stored data bytes to the PCI bus receive FIFO buffer 30a when the expansion bus interface 31 is not in use.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 and the MAU 26 each include a physical layer that senses idle to non-idle transitions on the media 50, as specified in Ethernet (ANSI/IEEE 802.3) protocol. The detection of activity on the media 50 is performed by the physical layer, which asserts a valid receive data indication to the MAC 20 layer in response to the detection and decoding of the preamble of a received data packet. Hence, the term activity on the media refers to reception of valid data. The sensed deassertion of the receive carrier occurs when the physical layer determines that the media 50 transitions from a nonidle to an idle state. The AUI 24 detects a collision by the CI inputs, and the MAU 26 detects a collision by sensing activity on both twisted pair signals RXD and TXD.

As described below, data packets received from the media 50 are processed by the MAC 22 to recover the payload data carried by the data packets. Once the MAC 22 recovers the payload data of the data packets, the MAC 22 stores the data bytes of the payload data into the MAC receive FIFO buffer 30b under the control of the FIFO control 34. The data bytes stored in the MAC receive FIFO buffer 30b are passed to the PCI bus receive FIFO buffer 30a and then the PCI bus interface unit based on the bus latency and burst size for the PCI bus 12. The network interface 10 includes a MAC pause controller 38, and wait time registers/counters 40 that identify thresholds for initiating flow control commands (i.e., PAUSE commands) by the MAC 22 and/or the FIFO controller 34. The MAC pause controller 38 monitors the input storage rate for data bytes received by the MAC 22 into the MAC receive FIFO buffer 30b based on write messages supplied to the MAC Pause Controller 38 from the MAC 22. The MAC pause controller 38 also monitors the rate of data output from the MAC receive FIFO buffer 30b based on read messages, bus latency information, and burst size information from the PCI Bus Interface Unit 16.

The MAC Pause Controller 38 determines whether to initiate a flow control mode based on the number of data bytes stored in the receive buffer. The MAC Pause Controller 38 also determines the duration of the flow control, referred to as the wait time, and includes internal counters to monitor the duration of the wait time.

Figure 2:
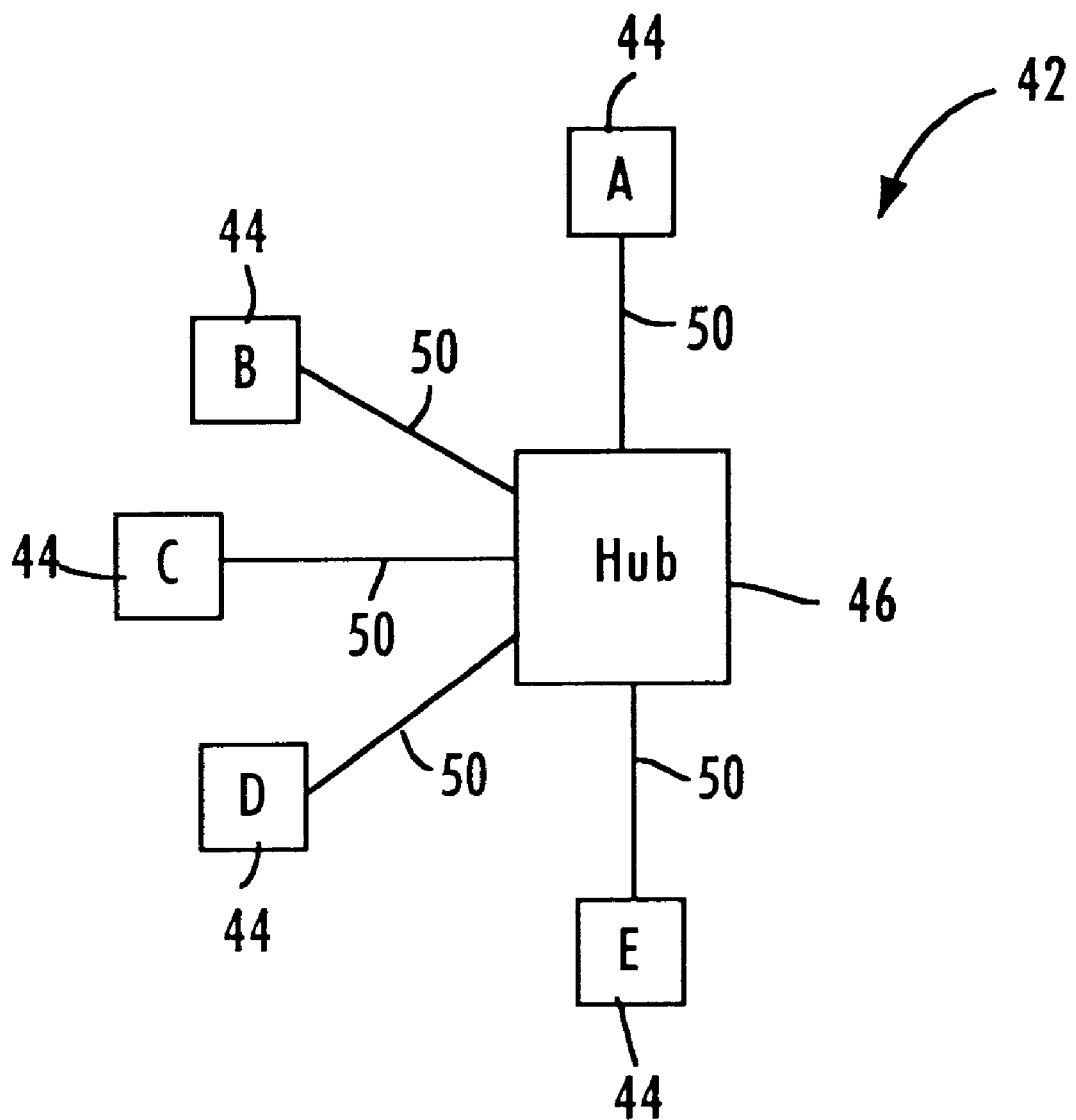
FIG. 2 is a diagram illustrating a network configuration of stations having the network interface of FIG. 1.

FIG. 2 is a diagram illustrating a network 42 having network elements 44 and 46 connected by a network media 50. The term network element refers generically to the network stations 44 and the hub 46. Each of the network stations 44 include the network interface 10 of FIG. 1. The network element 46 is a switched hub that includes a MAC controller and an internal data buffer storing data packets as data bytes before transmission to a network station 44. The media 50 may be either fiber optic, twisted pair wire, or coaxial, and hence may couple the interface 10 of each corresponding station 44 to 10BASE-T, 10BASE-2, 100BASE-TX, 100BASE-T4, or 100BASE-FX networks. The network 42 may operate at 10 megabits per second (10 Mbit/s), 100 megabits per second (100 Mbit/s), or 1000 megabits per second (1000 Mbit/s).

As shown in FIG. 2, the media 50 are connected to a hub 46. Since the network of FIG. 2 is implemented as a full-duplex network, the hub 46 is implemented as a switch. Full-duplex is defined as the capability of a network element 44 and 46 to simultaneously transmit and receive data packets on the corresponding media 50. Hence, CSMA/CD functions are disabled in a full-duplex network, such that controllers do not use carrier sense to defer to passing traffic, and do not use collision detect to abort, backoff, or retry transmissions.

An example of full-duplex communication in the network 42 of FIG. 2 involves point-to-point transmission between stations A and B via the hub 46. The hub 46 itself includes full-duplex capabilities, enabling stations A and B to each simultaneously transmit and receive data. In addition, stations A and B may simultaneously send data to station E, which simultaneously sends acknowledgment messages to stations A and B. Hence, full-duplex communication occurs between station A and the hub 46, station B and the hub 46, and station E and the hub 46. Alternatively, full duplex operation is also possible in the special case of two stations with no hub.

The hub 46 is a switch capable of performing auto-negotiation with the respective network stations 44, including a link start-up procedure each time a link to a station 44 is connected, powered on or reset. During auto-negotiation, the hub 46 automatically configures each station 44 for operating according to the network configuration parameters, for example, network topology, signaling, distance to hub, and number of stations on the network.

Upon completion of the auto-negotiation process by the hub 42, the network interface 10 in each station 44 will receive and store network configuration data, described below. Additional details regarding repeaters and auto-negotiation are disclosed in Breyer et al. "Switched and Fast Ethernet: How It Works and How to Use It", ZiffDavis Press, Emeryville, Calif. (1995), pp. 60–70, and Johnson, "Fast Ethernet: Dawn of a New Network", Prentice-Hall, Inc. (1996), pp. 158–175, the disclosures of which are incorporated in their entirety by reference.

According to the current IEEE 802.3x Revision 1.0 Full-Duplex Draft, stations 44 and the hub 46 are able to send a MAC control frame. Only one MAC control frame is currently specified by IEEE 802.3x[2], namely the PAUSE frame. The MAC control frame enables communications between the respective MAC controllers 22, for example, handshaking, signaling, etc. Hence, if station B detects an overload condition, described below, the MAC 22 of the station B outputs a pause frame to the MAC 22 of station A, requesting the station A to pause for a specified number of slot times. Similarly, if the hub 46 detects an overload condition in its internal buffers due to packet transmissions from one of the stations 44, the hub can output a pause frame for a specified number of slot times to the one station. A slot time ($t_s$) is defined as 512 bit times for 10 MBit/s and 100 MBit/s networks. The slot time ($t_s$) has a preferred value of 4096 bit times for 1000 MBits/s networks, although other values may be used consistent with network topology and propagation characteristics.

Each network element monitors its internal receive buffer to determine the number of stored data bytes. For example, each network station 44 monitors its internal MAC receive FIFO buffer 30b to determine the current number of stored data bytes. If the number of stored data bytes exceeds a certain threshold indicating that overflow of the receive FIFO buffer 30b will soon occur, for example within 5–10 slot times ($t_s$), the MAC pause controller 38 of the corresponding network station instructs the MAC 22 to initiate a flow control interval having a specified wait time ($t_w$). Each network station stores at least one threshold value and a time value specifying the duration of the wait time ($t_w$). The threshold levels and the wait time ($t_w$) may be programmed into a non-volatile memory in the network interface 10, or may be remotely programmed by the hub 46, a server, or a network administrator (i.e., some management entity).

FIG. 3 is a flow diagram illustrating a method of controlling transmission of data packets. Each network station 10 independently executes the disclosed method to prevent overflow of its corresponding MAC receive FIFO buffer 30b. The method begins in step 52 by storing threshold data (L) and wait time coefficients (k) in the wait time registers 40. The wait time registers 40 shown in FIG. 7 may include a plurality of buffer thresholds ($L_1$–$L_n$) and respective wait time coefficients ($k_1$–$k_n$). As described above with respect to FIG. 2, the buffer thresholds ($L_i$) and the respective wait time coefficients ($k_i$) may be received from a network manager via the media 50.

The MAC 22 then monitors the media 50 for activity, and detects the presence of a data packet in step 54. The MAC 22 reads the header information of the received data packet, and checks in step 56 if the destination address of the received data packet matches the station address. If the destination address does not match the station address, the packet is discarded in step 58. If the destination address of the received data packet matches the station address, the MAC 22 in step 60 recovers the payload data from the received data packet, and stores the data bytes of the recovered payload data in the MAC receive FIFO buffer 30b and notifies the MAC pause controller 38 of the stored data bytes.

The MAC pause controller 38 then checks in step 62 to determine the status of the MAC receive FIFO buffer 30b. The MAC pause controller 38 determines in step 64 whether flow control is needed, described in detail below, and initiates flow control by setting a flag (FC=1). If the MAC pause control determines that the status of the MAC receive FIFO buffer 30b does not require initiation of flow control, then the process returns to step 54 for reception of another data packet without interruption. However, if the MAC pause controller 38 determines in step 64 that the status of the MAC receive FIFO buffer 30b requires that flow control be initiated, the MAC pause controller 38 instructs the MAC 22 in step 66 to execute flow control for a determined wait time ($t_w$) determined by the MAC pause controller 38.

FIG. 4 is a flow diagram illustrating an exemplary implementation of flow control in a full-duplex network In this implementation, the MAC 22 outputs a flow control signal corresponding to the wait time $t_w$. As shown on FIG. 4, after the wait time is determined in step 70, the MAC 22 sends a PAUSE frame including the determined wait time ($t_w$). The protocol for the PAUSE frame is further described in the working proposal of IEEE 802.3x[2].

Figure 5A:
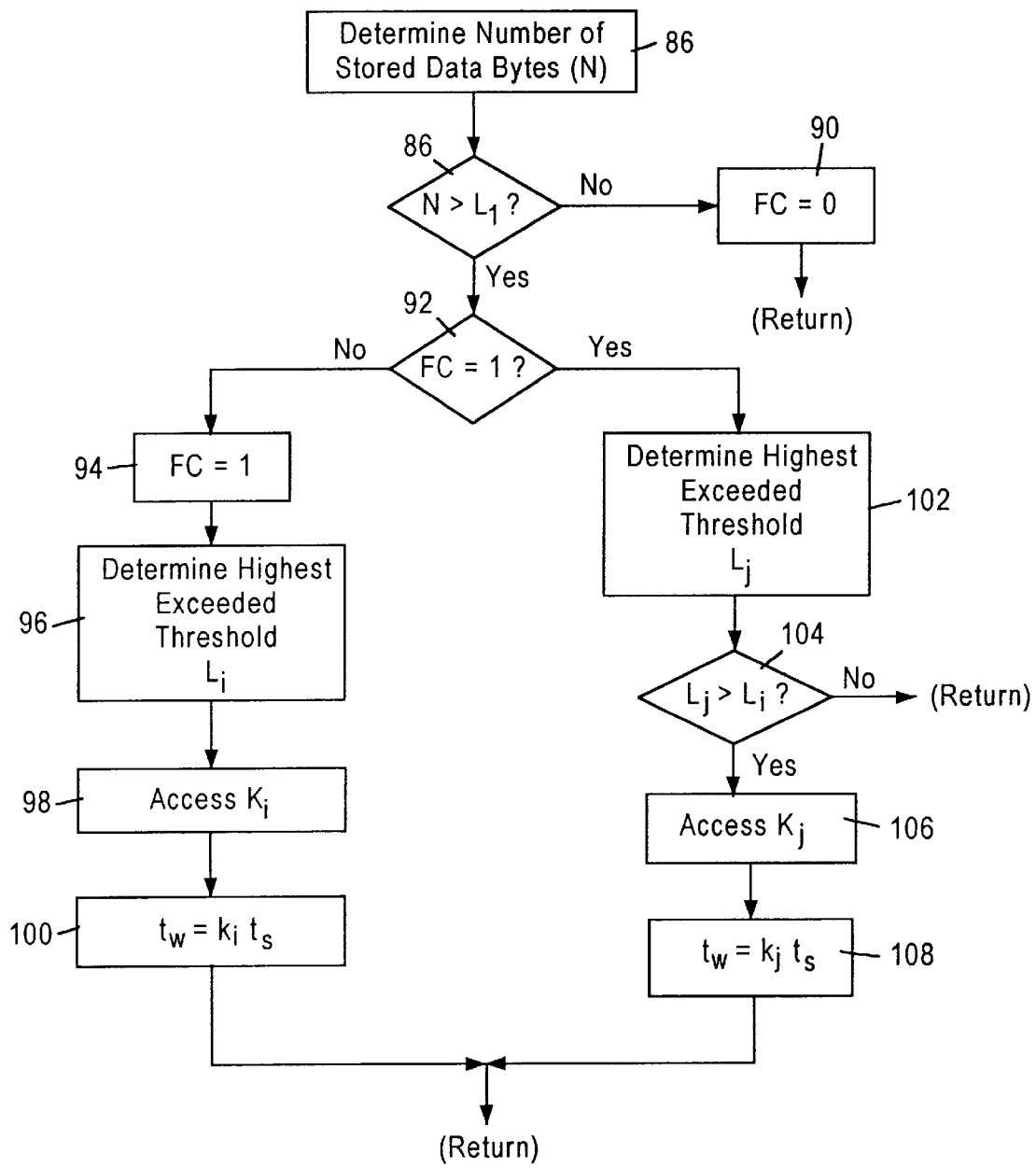
FIGS. 5A, 5B and 5C are flow diagrams illustrating alternative methods for initiating flow control for selected time intervals.
Figure 5B:
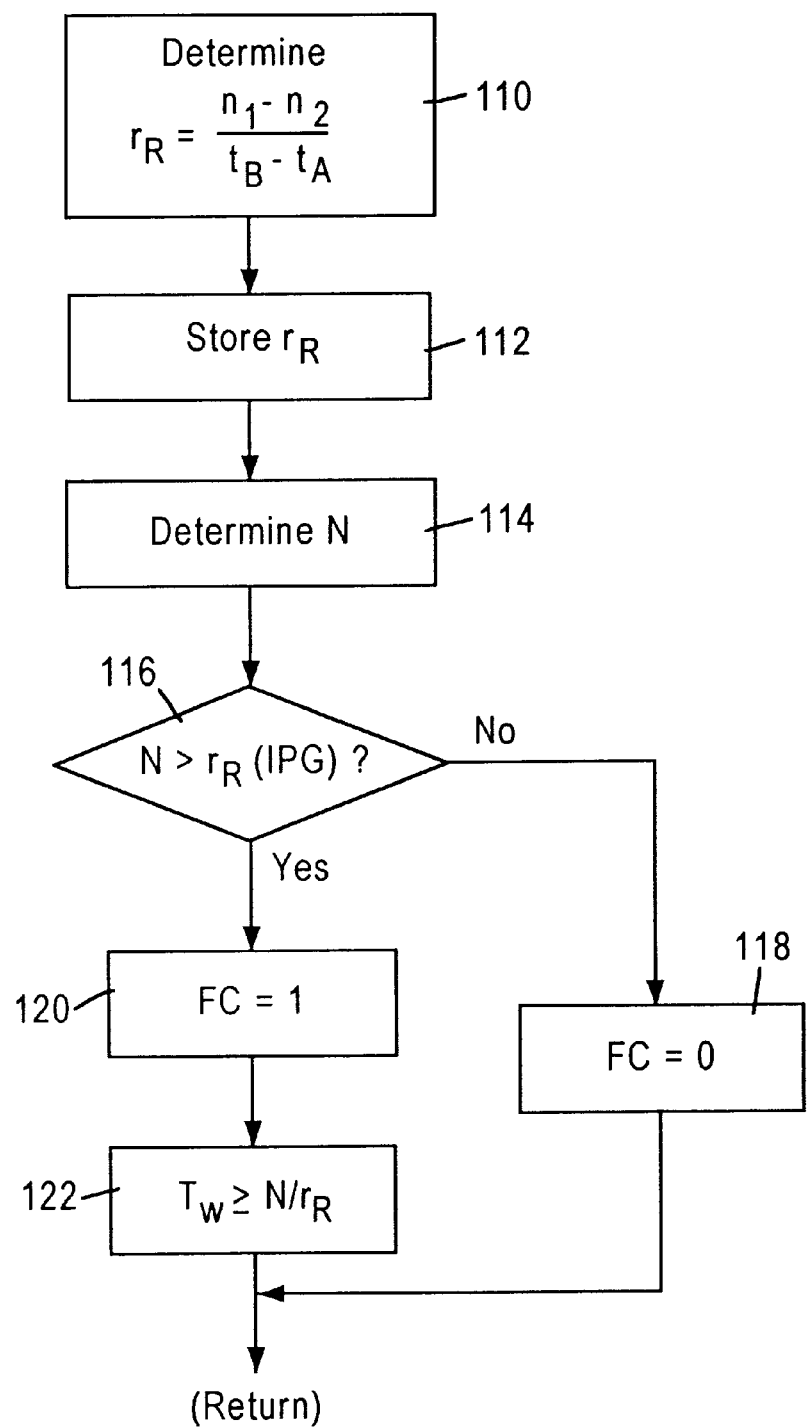
Figure 5C:
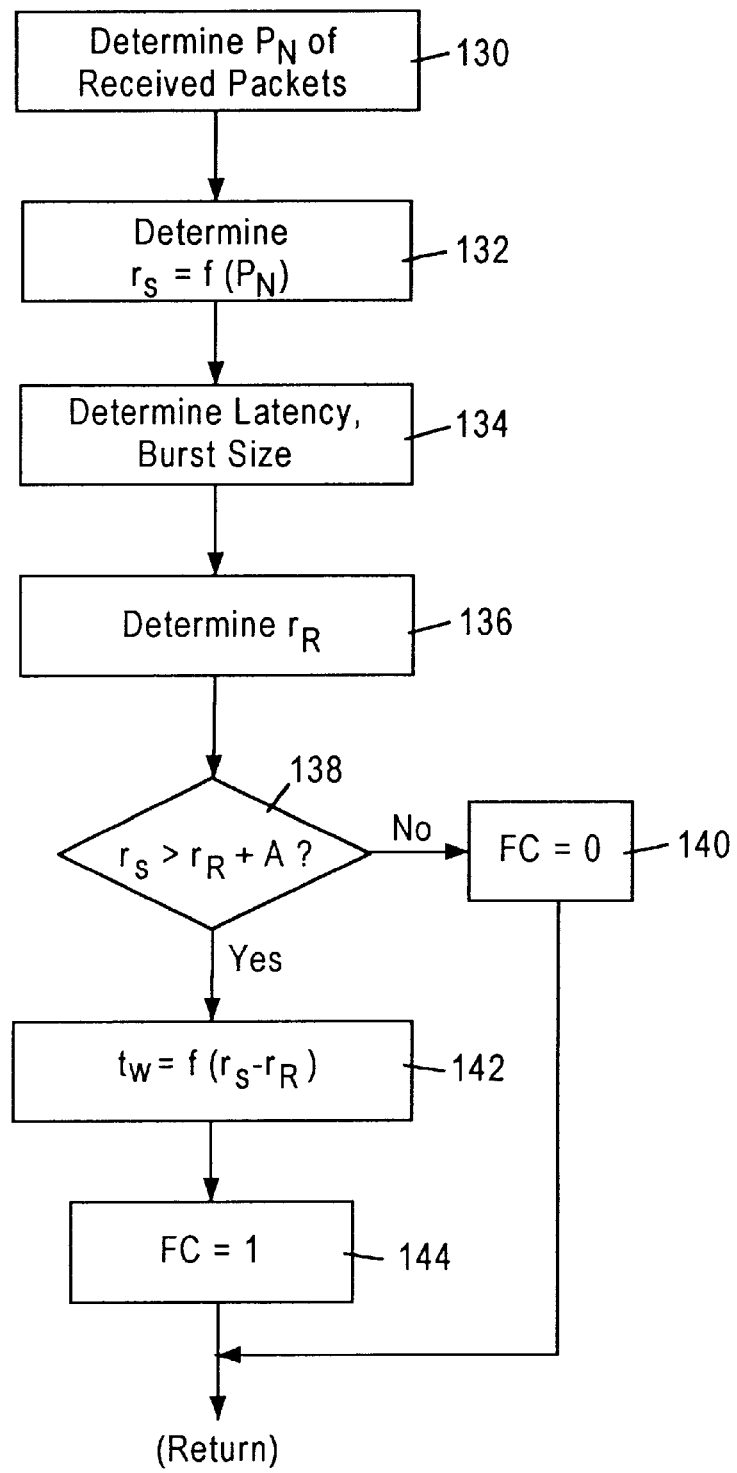

FIGS. 5A, 5B and 5C are flow diagrams illustrating in detail steps 62 and 64 of FIG. 3 determining the receive buffer status, determining whether flow control is needed, and calculating an appropriate wait time ($t_w$) for the flow control mode. Although the disclosed arrangements provide alternative techniques for initiating flow control, each of the variations include the basic functions of determining whether flow control is necessary, and selecting the wait time in response to the monitored number of data bytes stored in the receive buffer.

As shown in FIG. 5A, the MAC pause controller 38 begins in step 86 by determining the number of data bytes (N) stored in the MAC receive FIFO buffer 30b. The MAC pause controller 38 then checks in step 88 whether the number of stored data bytes (N) is greater than a minimum buffer threshold ($L_1$). If the number of stored data bytes (N) is not greater than the minimum threshold ($L_1$), then the MAC pause controller 38 determines no flow control is necessary, sets an internal flow control flag to zero (FC=0) in step 90, and returns to step 54 of FIG. 3.

If the MAC pause controller 38 determines in step 88 that the number of stored data bytes (N) exceeds the minimum threshold ($L_1$), the MAC pause controller 38 checks in step 92 whether the station 10 is already in a flow control mode by checking if the internal flag is already set. If the internal flag (FC) is not set, the MAC pause controller 38 sets the flag in step 94, and determines in step 96 the highest exceeded threshold ($L_i$).

Figure 6A:
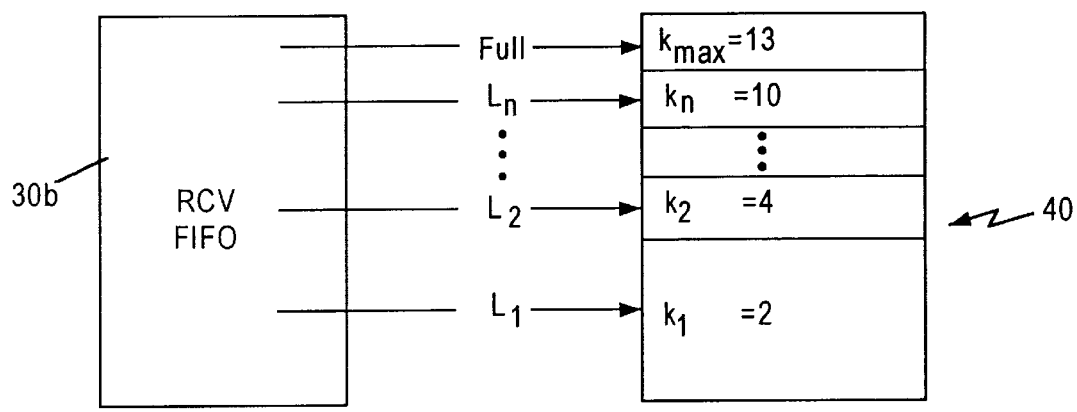
FIGS. 6A and 6B are diagrams illustrating the methods of FIGS. 5A and 5B for calculating a flow control time interval, respectively.

FIG. 6A is a diagram illustrating the relative position of buffer thresholds ($L1$, $L2$, . . . , $L_n$) corresponding to predetermined levels of data stored in the receive FIFO buffer 30b. As shown in FIG. 6A, if the number of data bytes in the receive FIFO buffer 30b is greater than the threshold L1, then a first wait time coefficient ($k_1$) is selected from wait time register 40. However, if the number of data bytes stored in the receive FIFO buffer 30b exceeds the second threshold ($L_2$), then the MAC pause controller 38 selects the corresponding second wait time coefficient ($k_2$).

Hence, the MAC pause controller 38 determines in step 96 the highest exceed threshold ($L_i$) as shown on FIG. 6A, and accesses in step 98 the corresponding coefficient ($k_i$). The access wait time coefficient ($k_i$) is used to calculate the wait time as an integer multiple of slot times ($t_s$) in step 100. After calculating the wait time in step 100, the MAC pause controller 38 returns the calculated wait time ($t_w$) to the MAC 22 in step 66, which uses the determined wait time to execute the flow control for full-duplex mode.

As shown in step 62 of FIG. 3 and more specifically in step 86 of FIG. 5A, the MAC pause controller 38 repeatedly checks the number of stored data bytes. For example, a transmitting station may continue to transmit data packets to the receiving station after the receiving station has sent a flow control message due to propagation delay between the two stations. Hence, if in step 92 of FIG. 5A, the flow control flag is already set, the MAC pause controller 38 determines in step 102 the highest exceeded threshold ($L_j$). The MAC pause controller 38 then checks in step 104 if the newly-exceeded second threshold ($L_j$) is greater than the first threshold ($L_i$) in step 104. If the MAC pause controller 38 determines that the number of stored data bytes (N) is greater than the first and second thresholds (i.e., $L_j > L_i$), the MAC pause controller 38 accesses the corresponding wait time coefficient ($k_j$) in step 106 and recalculates the wait time ($t_w$) in step 108. Hence, the method of FIG. 5A enables the wait time ($t_w$) defining the flow control interval to be reset to a greater value, providing the MAC receive FIFO buffer 30b additional time to empty the stored data bytes. Conversely, the MAC pause controller 38 may reduce the wait time ($t_w$) if the MAC receive FIFO buffer 30b has had a sufficient number of data bytes removed.

Hence, FIGS. 5A and 6A illustrate a relatively simple arrangement where flow control is initiated based upon predetermined threshold levels in the MAC receive FIFO buffer 30b. If the number of data bytes continues to exceed successive thresholds, the wait time can be adjusted accordingly to provide additional time for the MAC receive FIFO buffer 30b to be emptied.

FIGS. 5B and 5C disclose alternative arrangements that monitor the removal rate ($r_R$) of data from the MAC receive FIFO buffer 30b. If the data received by the network station exceeds the removal rate capacity of the MAC receive FIFO buffer 30b, the MAC pause controller 38 initiates flow control. The rate of emptying the receive buffers is determined by using continuous monitoring sources or statistical counters.

Figure 6B:
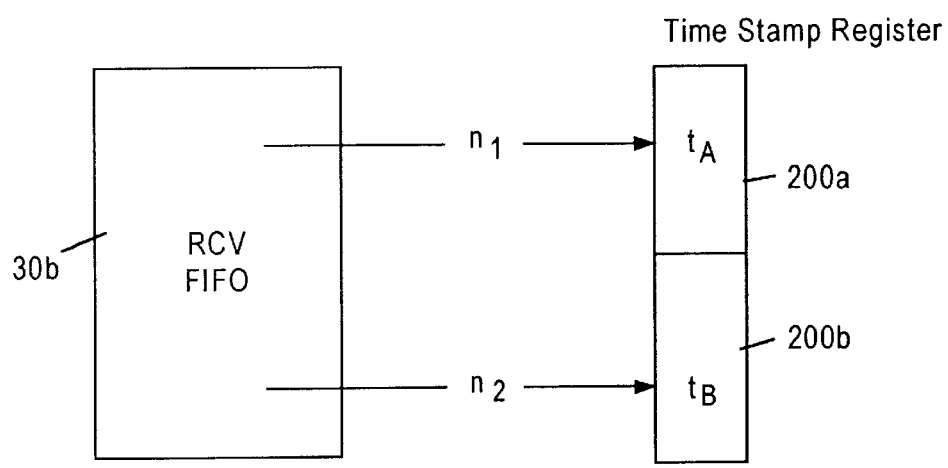

FIG. 5B is a flow diagram illustrating one arrangement for determining when to initiate flow control based upon the rate of emptying the receive buffer 30b, also referred to as the removal rate ($r_R$). The MAC pause controller 38 begins in step 110 by calculating the data removal rate ($r_R$) in accordance with time stamp values recorded with respect to respective thresholds. FIG. 6B illustrates the use of counters to determine the data removal rate ($r_R$). Specifically, the number of stored data bytes (N) is monitored and a time stamp value ($t_a$) is recorded in a time stamp register 200a when the number of stored data bytes reaches the first predetermined threshold (N=$n_1$). A second time stamp value ($t_b$) is recorded in time stamp register 200b sometime after the recording of the first time value in register 200a, i.e., when the number of data bytes have been removed from the MAC receive FIFO buffer 30b to a level corresponding to the second threshold (N=$n_2$).

Hence, the MAC pause controller 38 in step 110 of FIG. 5B determines the removal rate ($r_R$) based upon the relative difference between the threshold values ($n_1$-$n_2$) and the difference in time stamp values ($t_b$-$t_a$). The determined removal rate ($r_R$) is then stored in step 112 by the MAC pause controller 38 for future reference.

The MAC pause controller 38 then continually monitors the MAC receive FIFO buffer 30b to determine the number of stored data bytes (N) in step 114. A transmitting station will pause in between uninterrupted consecutive transmissions by a minimum interpacket gap (IPG), defined as 96 bit times for 10 Mb/s, 100 Mb/s, and 1000 Mb/s networks. Hence, the MAC pause controller 38 checks in step 116 if the stored number of data bytes (N) is greater than the number of data bytes that would be removed from the MAC receive FIFO buffer 30b in one time slot interval ($r_R$(IPG)).

If in step 116 the stored number of data bytes does not exceed the threshold based on the removal rate, the MAC pause controller 38 sets the flag to zero in step 118, indicating flow control is not necessary. However, if in step 116 the number of stored data bytes exceeds the threshold, the MAC pause controller 38 sets the FC flag in step 120, and calculates the wait time ($t_w$) as greater than or equal to the amount of time necessary to remove the number of data bytes (N/$r_R$) in step 122.

Hence, the MAC pause controller 38 monitors the rate at which the MAC receive FIFO buffer 30b is emptied, hence enabling the network station 10 to adaptively adjust the thresholds and wait times as necessary. Moreover, the adaptive calculation of the threshold point and the wait times enables the size of the MAC receive buffer 30b to be reduced. Hence, since FIFO buffer sizes range from 256 bytes to 8 K bytes, the size of the buffer may be reduced, for example to 1 K byte.

FIG. 5C illustrates another arrangement for determining whether flow control is necessary, and for calculating the wait time ($t_w$). According to the arrangement disclosed in FIG. 5C, the removal rate ($r_R$) of the MAC receive FIFO buffer 30b is compared with the input storage rate ($r_s$) to determine whether the input storage rate substantially exceeds the removal rate. The MAC pause controller 38 begins in step 130 by determining the number of bytes in the payload ($P_N$) of a received data packet. Hence, the MAC pause controller 38 keeps track of the distribution of payload data sizes by monitoring the history of the data activity over the network. The payload size ($P_N$) corresponds to the number of bytes in the payload of at least one received data packet.

The MAC pause controller 38 then calculates in step 132 a storage rate ($r_s$) as a function of the payload sizes. As recognized in the art, the MAC pause controller 38 calculates the storage rate based upon payload sizes, network data rates, network traffic, etc. based upon statistical analysis. The MAC pause controller 38 then determines the dynamic variables of the PCI bus 12 based upon PCI bus latency characteristics and PCI burst size data in step 134, supplied by the PCI bus interface unit 16. Both the PCI burst size and the PCI bus latency will be variable. After obtaining the dynamic information related to the PCI bus in step 134, the MAC pause controller 38 determines the removal rate ($r_R$) in step 136 based upon the PCI bus information, including the latency and burst size.

After calculating the storage and removal rates, the MAC pause controller 38 determines in step 138 if the storage rate exceeds the removal rate by a predetermined amount (A) corresponding to the number of data bytes stored in the MAC receive FIFO 30b within a given time interval. If the MAC pause controller 38 determines that the storage rate does not exceed the removal rate by the predetermined amount, the MAC pause controller 38 sets the flow control flag in step 140 to zero. However, if the storage rate substantially exceeds the removal rate, then the MAC pause controller 38 calculates the wait time ($t_w$) as a function of the difference between the storage rate and the removal rate in step 142, and sets the flow control flag to one in step 144.

Figure 7:
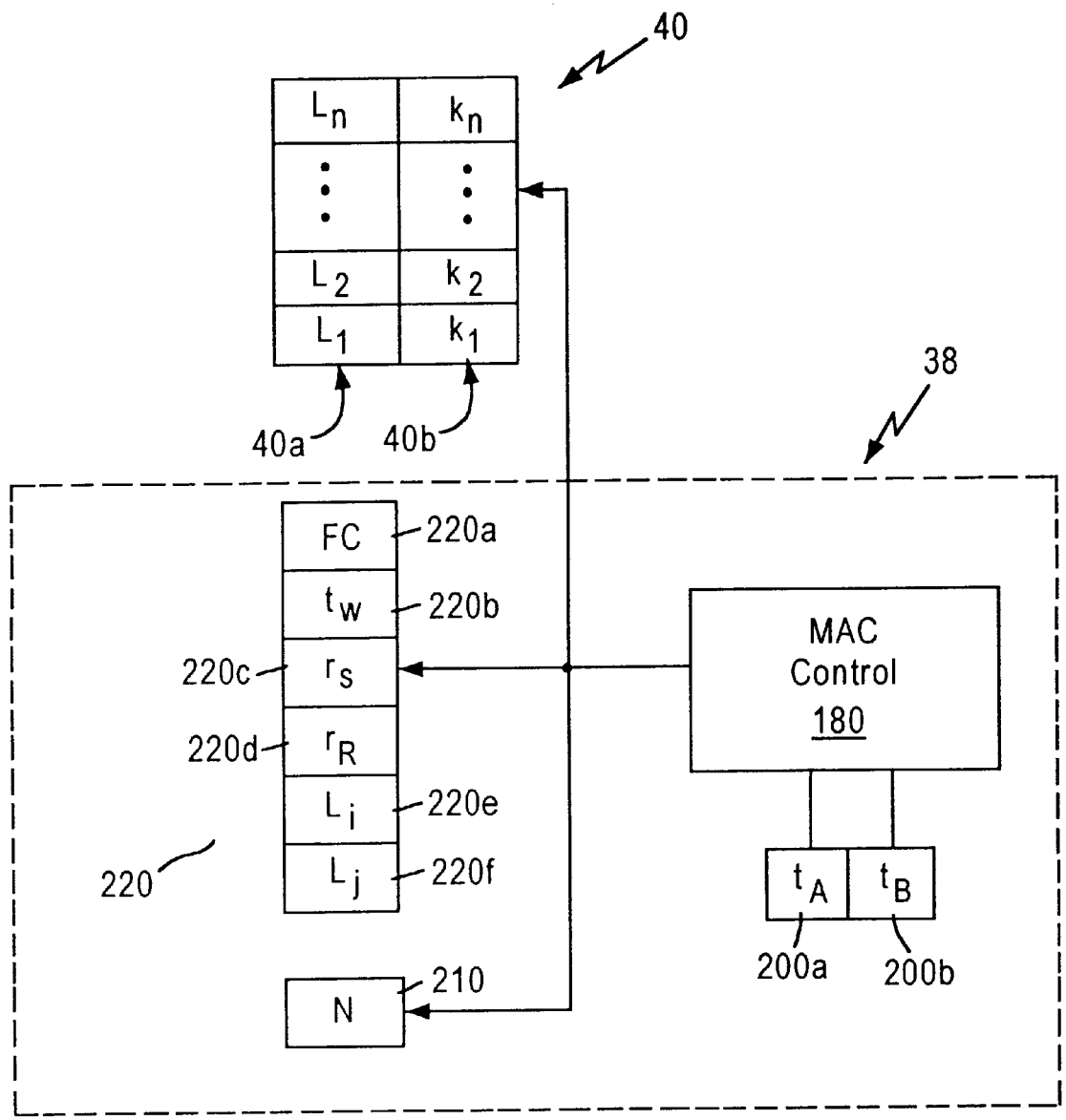
FIG. 7 is a block diagram of the media access control (MAC) of FIG. 1.

FIG. 7 is a block diagram of the MAC pause controller 38. The controller 38 includes a control portion 180 that determines whether to initiate flow control and calculates the wait time. The controller 38 also includes counters 200 that count the time interval for the number of the stored data bytes to change from the first threshold ($n_1$) to the second threshold ($n_2$), shown in FIG. 6B. Alternately, the time interval can be determined using a single programmable timer.

The controller 38 also includes a counter 210 that tracks the number of data bytes (N) stored in the MAC receive FIFO buffer 30b. Register 220a stores the flow control flag, and counter 220b counts the calculated wait time ($t_w$). In addition, registers 220c and $220_d$ store the storage and removal rates, respectively, calculated in FIG. 5C, and registers 220e and 220f store the maximum exceeded threshold value as determined in FIG. 5A.

Although the disclosed embodiments have been described in connection with the monitoring of stored data bytes in network stations of recovered payload data, it will be appreciated that the disclosed arrangements can be implemented in other network elements. For example, the hub 46 may include internal buffers storing data packets received from a transmitting station before output to a destination station. The hub 46 may monitor the number of stored data bytes in its internal buffer and selectively output a flow control signal, where the number of stored data bytes corresponds to the number of data packets and the size (i.e., the byte size) of each packet.

The above-described exemplary network arrangement represents one arrangement in which congestion control is provided. However, this arrangement, and other network arrangements that provide congestion control, are enhanced when the control frames can be sent prior to the actual congestion events. This results in improved control over the input data streams. In order to provide this capability to network arrangements, the present invention determines the link latency between stations on a network, as described below. When the congestion control algorithm can take into account the round-trip delay of a full-duplex link, the congestion control algorithm in the switch is better able to control the input data streams. The following is a description of a method and apparatus for determining the latency of a link in accordance with embodiments of the present invention.

Figure 8:
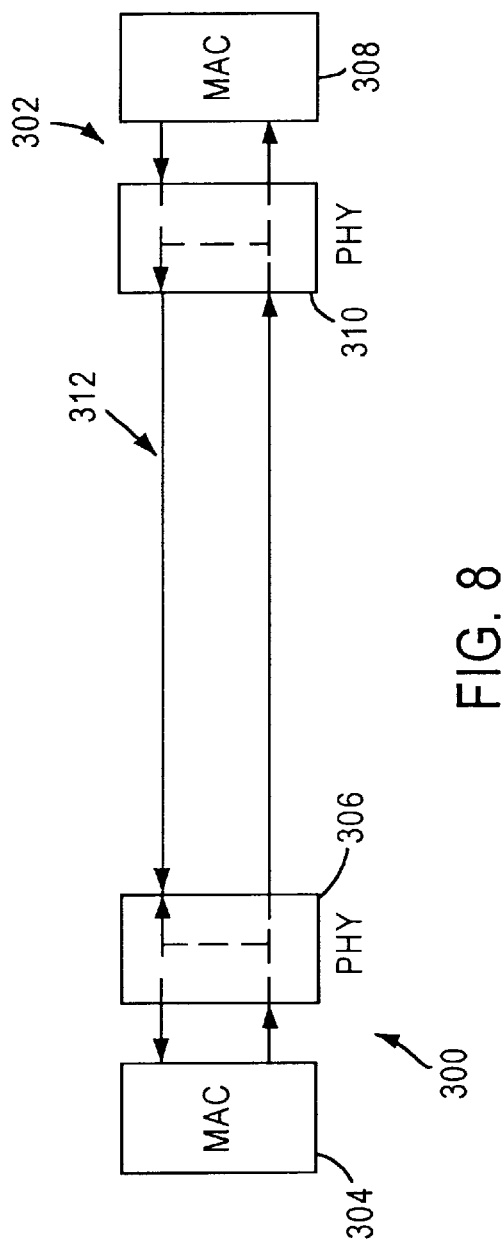
FIG. 8 is a block diagram of a full-duplex link.

FIG. 8 is a schematic depiction of a full-duplex link. For purposes of illustration and explanation, the figure only depicts the MAC layer and the physical device layer of two stations 300 and 302. The station 300 is termed the local station and the station 302 is the remote station in the following description, although as will become apparent, either or both of the stations can act as the local station and/or the remote station.

The local station 300 has a MAC layer 304, which may be configured the same as MAC layer 20 in FIG. 1. The local station 300 also has a physical layer device 306, which may be a switch such as switch 20 (hub) depicted in FIG. 2. The remote station 302 has a similarly configured MAC layer 308 and physical layer device 310. The stations 300, 302 are connected by a transmission medium of the network 312, which may be, for example, copper or optical fiber.

As seen in FIG. 8, the physical device layers 306, 310 have two main data paths, a loopback path and a direct path. The direct path transmits all data from the MAC layer (304, for example) onto the network 312 and sends all received data from the network 312 to the MAC layer 304. When placed in local loopback, data transmitted by the MAC layer 304 is looped back to the MAC layer 304 at the local physical layer device 306 without being transmitted onto the network 312. If the physical layer device, such as physical layer device 310 of the remote station 302 is placed in remote loopback, data transmitted into the physical layer device 310 from the network 312 is looped back onto the network 312, bypassing the MAC layer 308 of the remote station 302.

Figure 9:
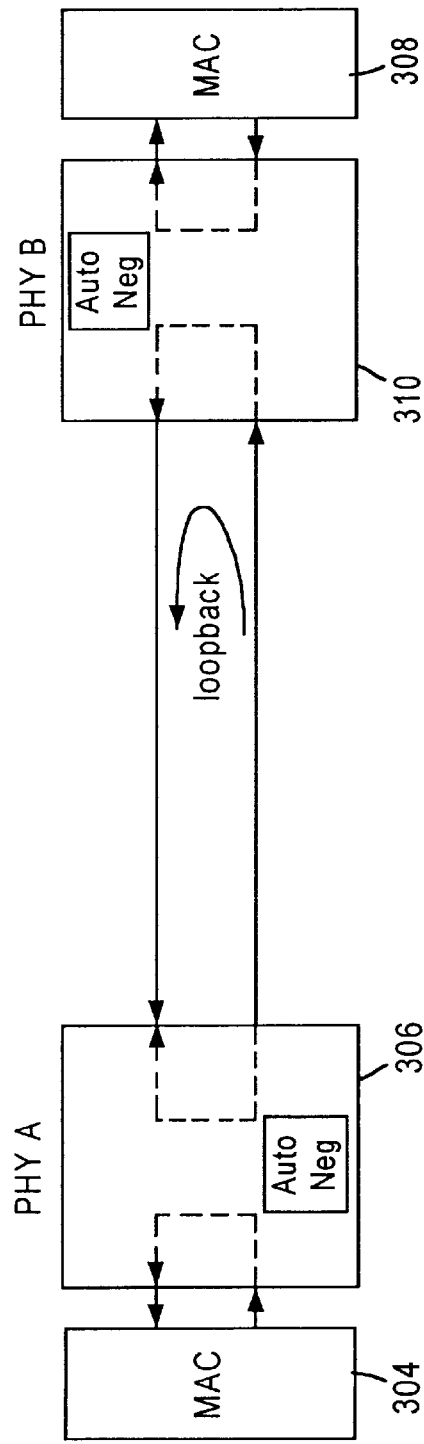
FIG. 9 is a block diagram of a full-duplex link in remote loopback configuration mode in accordance with an embodiment of the present invention.

An example of the physical layer devices 306, 310 when they are in a remote loopback configuration is depicted in FIG. 9. In this configuration, the data transmitted by the local station 300 onto the network 312 is looped back through the physical layer device 310 of the remote station 302 to the physical layer device 306 of the local station 300. As can be seen in this figure, any data transmitted by the MAC layers 304, 308 are looped back to the MAC layers 304, 308 without reaching the network 312.

Since the local loopback and remote loopback may be independent operations, the stations 300, 302 may also be configured such that a station is placed in local loopback and not in remote loopback. If this occurs, data entering the physical layer device 306 or 310 from the network 312 is discarded.

Figure 10:
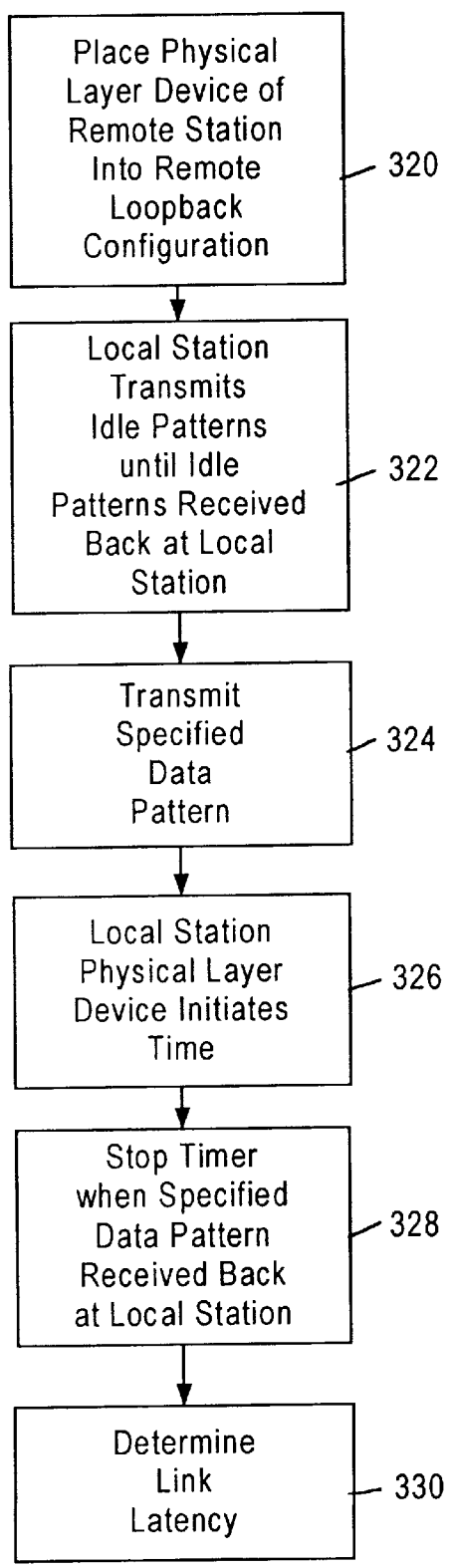
FIG. 10 is a flow chart of a method of determining the link latency of a link, in accordance with an embodiment of the present invention.

A basic flow chart of the method for measuring the round-trip delay (the link latency) in accordance with exemplary embodiments of the present invention is depicted in FIG. 10. In step 320, the physical layer device 310 of the remote station 302 is placed into the remote loopback configuration in response to a signal received from the network 312. In certain embodiments, this remote loopback configuration signal is contained within the auto-negotiation signal transmitted by the local station 300. All of the data received by the physical layer device 310 of the remote station 302 from the network 312 will be transmitted back onto the network 312, bypassing the MAC layer 308.

The physical layer device 306 then transmits Ethernet idle patterns (step 322) until these patterns are received back at the physical layer device 306. This confirms that the link is complete and looped back correctly. In step 324, a fixed and unique data pattern (i.e., a specified data pattern) is transmitted, such as the JK pattern in 100 Mbit Ethernet systems. Ethernet idle patterns are transmitted prior to and after the JK pattern.

Coincident with the transmission of the specified data pattern, the physical layer device 306 initiates a timer (step 326). The timer is stopped upon the reception of the specified data pattern (the JK pattern, for example), in step 328.

In step 330, the link latency is determined from the timer. The time represents the round trip delay (or two link delays). Dividing this time by 2 and multiplying by the speed of the network 312 results in the value of the one-way link delay in bits.

Once the local physical layer device 306 has determined the link latency, its congestion control algorithm will take the link latency into account in determining when to issue PAUSE frames. For example, the threshold indicating that the receive FIFO buffer will overflow may be changed in dependence on this determined link latency. Also, the wait time may be increased or decreased in dependence on the link latency. The specific manner in which the determined link latency is used to fine tune the congestion control algorithm is left to the designer of the congestion control algorithm.

Figure 11:
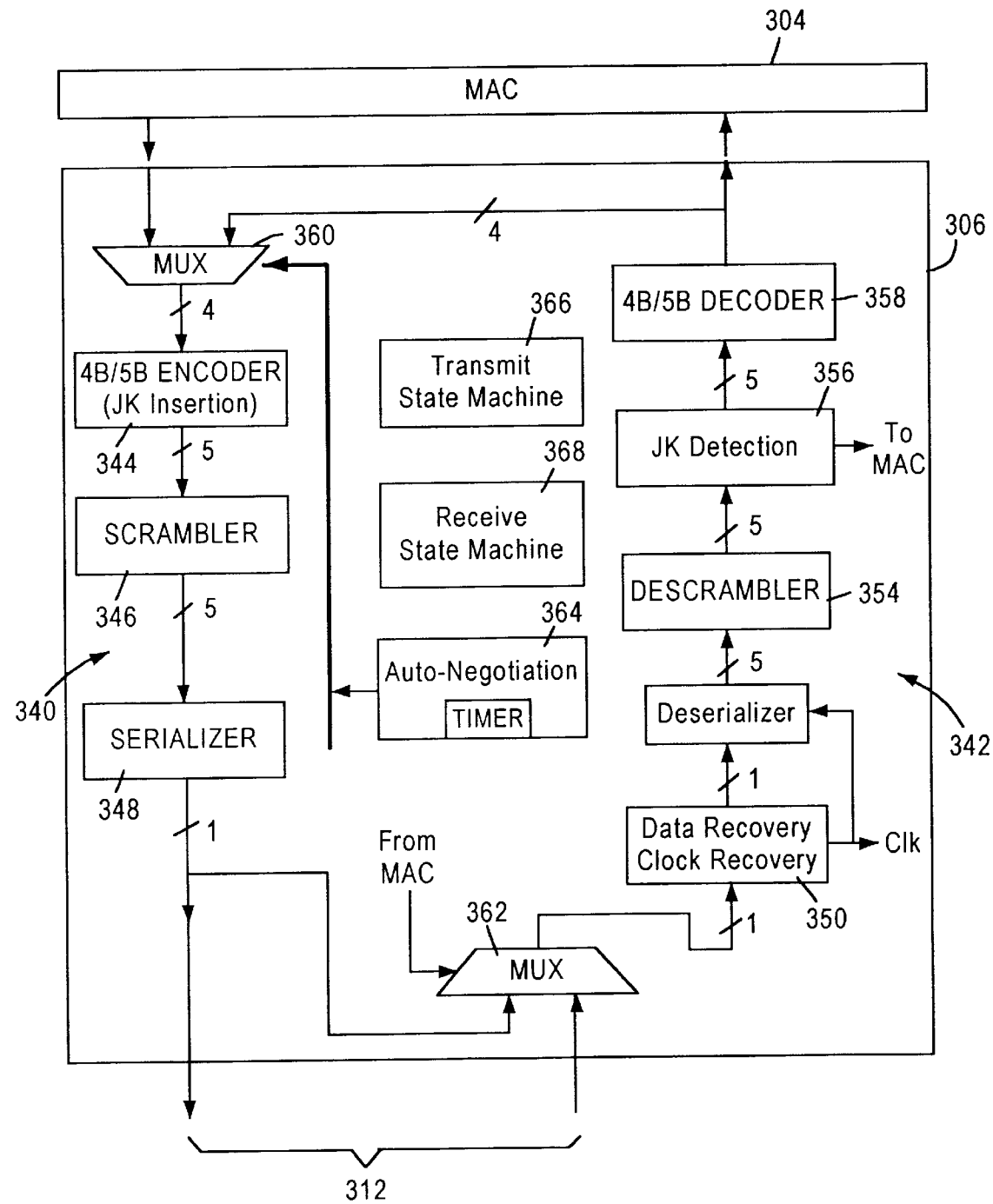
FIG. 11 is a block diagram of a physical layer device constructed in accordance with an embodiment of the present invention.

An exemplary embodiment of a physical layer devices (306 or 310) is depicted in FIG. 11. The physical layer device 306, 310 may serve as either the local or remote station, or both. The physical layer device 306 has a transmit side 340 and a receive side 342. The transmit side 340 includes a 4B/5B encoder 344 that encodes the data to be transmitted from 4 bits parallel to 5 bits parallel in a conventional manner. The insertion of the specified data pattern, such as the JK pattern, is performed in the encoder 344.

The 5 bit parallel encoded signal to be transmitted is provided to a scrambler 346 that scrambles the bits to randomize the bits, using a linear feedback shift register. This scrambler 346 is typically disabled when the transmission link of the network 312 is fiber, since randomization is not necessary with fiber. The 5 parallel scrambled bits are serialized by a serializer 348 and transmitted one bit at a time onto the network 312, when the physical layer device 306 is not in a local loopback configuration.

The receive side 342 includes elements that perform the opposite functions as that in the transmit side 340. These elements include a data recovery and clock recovery block 350 coupled to the network 312. The data recovery and clock recovery block 350 recovers a 125 Mbit clock and the data from the 125 Mbps stream arriving from the network 312. The recovered clock is provided to a deserializer 352 that receives the serial bit stream and generates 5 bit pieces of data. The descrambler 354 unscrambles the signal (if the transmission medium is copper) and the JK detection unit 356 alerts the MAC layer 304 that a packet is arriving. The 4B/5B decoder 358 decodes the data to 4 bit pieces of data that are then provided to the MAC layer 304.

The physical layer device 306 has two multiplexers 360, 362 that are controlled to place the physical layer device into a direct path configuration, a local loopback configuration, or a remote loopback configuration. The multiplexer 360 has a first input coupled to the MAC layer 304 of the station, and a second input coupled to the output of the receive side 342. The output of the multiplexer is provided to the input of the encoder 344. The selection of the input is controlled at the control input of the multiplexer 360 in response to a control signal issued by an auto-negotiation state machine 364, for example. When the physical layer device 306 is in the direct path configuration or the local loopback configuration, the first input (from the MAC layer 304) will be selected by the multiplexer 360. In the remote loopback configuration, the second input (from the receive side 342) will be selected.

The multiplexer 362 operates similarly, and may be controlled by the a control signal from the MAC layer 304, for example. The first input is from the transmit side 340, and the second input is from the network 312. When the physical layer device 306 is in the local loopback configuration, the first input at the multiplexer 362 is selected. When the physical layer device 306 is in the direct path configuration or the remote loopback configuration, the multiplexer 362 is controlled to select the second input (from the network 312).

As stated earlier, in certain embodiments, each physical layer device may be controlled by another physical layer device to be configured into a remote loopback configuration, such that each physical layer device may make its own determination of the link latency. Alternatively, in other embodiments, only one of the physical layer devices in a link will determine the link latency, and will then provide this determined link latency to the other physical layer device in the link.

The physical layer device 306 includes a transmit state machine 366, that when not receiving data from the MAC layer 304 for transmission, sends out idle patterns. The receive state machine 368 is the reverse of the transmit state machine 366, and controls the receipt of data.

The auto-negotiation state machine 364 performs the auto-negotiation procedure upon start-up of the link. In this procedure, the Ethernet stations 300, 302 transmit and receive information regarding the speed of the link (10 Mbps or 100 Mbps), the type of physical layer device 306, 310 (100 Base-T2, 100 Base-TX, 100 Base-T4) and the type of link (full-duplex, half-duplex). An extension of auto-negotiation termed "next pages" is used in exemplary embodiments to set the remote physical layer device into the remote loopback configuration. The auto-negotiation signal may therefore be considered to comprise a series of signals. However, the remote loopback configuration signal may also be generated and transmitted by other elements in the physical layer, or in the MAC layer, as provided in other embodiments of the present invention.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method of determining a link latency between stations on a network, comprising the steps of:
    placing a physical layer of a remote station into a remote loopback configuration such that all data received from the network is transmitted back onto the network;
    transmitting a specified data pattern from a local station to the remote station;
    detecting at the local station the specified data pattern that has been transmitted back onto the network by the remote station; and
    determining the link latency between the local station and the remote station as a function of the time elapsed between the transmitting of the specified data pattern from the local station and the detecting of the specified data pattern at the local station.

2. The method of claim 1, further comprising the steps of initiating a timer at the local station coincident with the transmitting of the specified data pattern, and stopping the timer upon the detection of the specified data pattern at the local station.

3. The method of claim 1, wherein the step of determining the link latency comprises the steps of dividing the time elapsed by two and multiplying by the speed of the network.

4. The method of claim 1, wherein the step of placing the physical layer includes transmitting a remote loopback signal from the local station to the remote station, the physical layer at the remote station being responsive to the remote loopback signal to configure itself into the remote loopback configuration.

5. The method of claim 4, wherein the step of transmitting the remote loopback signal includes the step of transmitting of an auto-negotiation signal from the local station to the remote station, the auto-negotiation signal including the remote loopback signal.

6. The method of claim 1, further comprising the step of the remote station determining the link latency between the remote station and the local station by the steps of:
    placing a physical layer of the local station into a remote loopback configuration such that all data received from the network is transmitted back onto the network;
    transmitting a specified data pattern from the remote station to the local station;
    detecting at the remote station the specified data pattern that has been transmitted back onto the network by the local station; and
    determining the link latency between the remote station and the local station as a function of the time elapsed between the transmitting of the specified data pattern from the remote station and the detecting of the specified data pattern at the remote station.

7. The method of claim 1, further comprising the step of transmitting a link complete test signal prior to the transmitting of the specified data pattern to test whether the physical layer of the remote station is in the remote loopback configuration and the link between the local station and the remote station is complete.

8. A method of controlling a remote station on a network, comprising the steps of:
    transmitting a remote loopback control signal from a local station to a remote station;
    detecting at the remote station the reception of the remote loopback control signal; and
    configuring the remote station in response to the reception of the remote loopback control signal such that all data received from the network is transmitted back onto the network.

9. The method of claim 8, wherein the step of transmitting the remote loopback control signal includes transmitting an auto-negotiation signal from the local station to the remote station, the auto-negotiation signal containing the remote loopback control signal.

10. A method of controlling congestion at a local station in a network, comprising the steps of:
    placing a physical layer of a remote station into a remote loopback configuration such that all data received from the network is transmitted back onto the network;
    transmitting a specified data pattern from a local station to the remote station;
    detecting at the local station the specified data pattern that has been transmitted back onto the network by the remote station;
    determining a link latency between the local station and the remote station as a function of the time elapsed between the transmitting of the specified data pattern from the local station and the detecting of the specified data pattern at the local station; and
    transmitting a congestion relieving signal from the local station to the remote station as a function of the determined link latency.

11. The method of claim 10, wherein the congestion relieving signal is a pause frame, the method further comprising inhibiting transmission by the remote station as a function of information contained in the pause frame.

12. The method of claim 11, wherein the step of transmitting a congestion relieving signal includes accounting for the link latency in determining when to transmit the congestion relieving signal to the remote station.

13. A physical layer device connecting a station to a network, comprising:
- a transmit side which transmits data from the station onto the network;
- a receive side which receives data from the network and provides the data to the station;
- a configurable internal routing arrangement remotely controllable in response to a remote loopback configuration signal received from the network to couple the receive side to the transmit side such that all data received from the network is transmitted directly back onto the network.

14. The device of claim 13, wherein the configurable internal routing arrangement includes a multiplexer having a first input coupled to the station, a second input coupled to an output of the receive side, an output coupled to the transmit side, and a control input that selects which of the first and second inputs is provided at the output in response to a control signal at the control input.

15. The device of claim 14, further comprising an auto-negotiation state machine that generates the control signal to cause the multiplexer to select the second input, in response to detection of the remote loopback configuration signal.

16. The device of claim 15, wherein the auto-negotiation state machine includes means for generating a remote loopback configuration signal for transmission to a remote physical layer device on the network.

17. The device of claim 16, further comprising a timer that determines a time interval of transmission of a specified data pattern by the physical layer device until the specified data pattern is received by the physical layer device from the network.

* * * * *